US012603429B2

(12) United States Patent
Chang et al.

(10) Patent No.: US 12,603,429 B2
(45) Date of Patent: Apr. 14, 2026

(54) MOBILE DEVICE SUPPORTING WIDEBAND OPERATION

(71) Applicant: Acer Incorporated, New Taipei City (TW)

(72) Inventors: Kun-Sheng Chang, New Taipei City (TW); Ching-Chi Lin, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 51 days.

(21) Appl. No.: 18/896,144

(22) Filed: Sep. 25, 2024

(65) Prior Publication Data

US 2026/0011916 A1 Jan. 8, 2026

(30) Foreign Application Priority Data

Jul. 5, 2024 (TW) ................................ 113125211

(51) Int. Cl.
*H01Q 1/48* (2006.01)
*H01Q 5/10* (2015.01)
(Continued)

(52) U.S. Cl.
CPC ................. *H01Q 5/20* (2015.01); *H01Q 1/48* (2013.01); *H01Q 5/10* (2015.01); *H01Q 9/0421* (2013.01)

(58) Field of Classification Search
CPC ........... H01Q 1/48; H01Q 1/52; H01Q 1/243; H01Q 1/245; H01Q 1/2266; H01Q 5/40;
(Continued)

(56) References Cited

U.S. PATENT DOCUMENTS 9,992,312 B1 * 6/2018 Deng ........................ H04Q 1/24
11,264,699 B2 * 3/2022 Chang .................. H01Q 1/2291
(Continued)

FOREIGN PATENT DOCUMENTS

TW 201238151 A 9/2012
TW 201543750 A 11/2015
(Continued)

OTHER PUBLICATIONS

Chinese language office action dated Apr. 28, 2025, issued in application No. TW 113125211.
(Continued)

*Primary Examiner* — Tung X Le
(74) *Attorney, Agent, or Firm* — McClure, Qualey & Rodack, LLP

(57) ABSTRACT

A mobile device includes a feeding radiation element, a first radiation element, a second radiation element, a grounding radiation element, a shorting radiation element, and a third radiation element. The first radiation element is coupled to the feeding radiation element. The second radiation element is coupled to the feeding radiation element. The first radiation element and the second radiation element substantially extend in opposite directions. The first radiation element is further coupled through the grounding radiation element to a ground voltage. The shorting radiation element is coupled between the feeding radiation element and the grounding radiation element. A closed loop structure is formed by the feeding radiation element, the first radiation element, the grounding radiation element, and the shorting radiation element. The third radiation element is coupled to the ground voltage. The third radiation element is adjacent to the feeding radiation element and the second radiation element.

15 Claims, 5 Drawing Sheets

(51) Int. Cl.
*H01Q 5/20* (2015.01)
*H01Q 9/04* (2006.01)

(58) Field of Classification Search
CPC ........ H01Q 5/371; H01Q 5/378; H01Q 5/385; H01Q 9/42; H01Q 21/28; H01Q 21/30
See application file for complete search history.

(56) References Cited

U.S. PATENT DOCUMENTS

| | | | | |
|---|---|---|---|---|
| 11,355,847 | B2 * | 6/2022 | Fang | H01Q 5/25 |
| 11,502,426 | B2 | 11/2022 | Sugimoto | |
| 11,996,630 | B2 * | 5/2024 | Zhao | H01Q 1/48 |
| 2024/0195082 | A1 * | 6/2024 | Lo | H01Q 5/378 |
| 2025/0112363 | A1 * | 4/2025 | Lin | H01Q 5/371 |

FOREIGN PATENT DOCUMENTS

| | | | |
|---|---|---|---|
| TW | I736387 | B | 8/2021 |
| TW | 202425420 | A | 6/2024 |

OTHER PUBLICATIONS

Chinese language office action dated Nov. 14, 2025, issued in application No. TW 113125211.

* cited by examiner

MOBILE DEVICE SUPPORTING WIDEBAND OPERATION

CROSS REFERENCE TO RELATED APPLICATIONS

This application claims priority of Taiwan Patent Application No. 113125211 filed on Jul. 5, 2024, the entirety of which is incorporated by reference herein.

BACKGROUND OF THE INVENTION

Field of the Invention

The disclosure generally relates to a mobile device, and more particularly, to a mobile device supporting wideband operations.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient operational bandwidth, it may degrade the communication quality of the relative mobile device. Accordingly, it has become a critical challenge for designers to design a small-size, wideband antenna structure.

BRIEF SUMMARY OF THE INVENTION

In an exemplary embodiment, the invention is directed to a mobile device supporting wideband operations. The mobile device includes a feeding radiation element, a first radiation element, a second radiation element, a grounding radiation element, a shorting radiation element, and a third radiation element. The feeding radiation element has a feeding point. The first radiation element is coupled to the feeding radiation element. The second radiation element is coupled to the feeding radiation element. The first radiation element and the second radiation element substantially extend in opposite directions. The first radiation element is further coupled through the grounding radiation element to a ground voltage. The shorting radiation element is coupled between the feeding radiation element and the grounding radiation element. A closed loop structure is formed by the feeding radiation element, the first radiation element, the grounding radiation element, and the shorting radiation element. The third radiation element is coupled to the ground voltage. The third radiation element is adjacent to the feeding radiation element and the second radiation element. An antenna structure is formed by the feeding radiation element, the first radiation element, the second radiation element, the grounding radiation element, the shorting radiation element, and the third radiation element.

In some embodiments, the mobile device further includes a dielectric substrate. The feeding radiation element, the first radiation element, the second radiation element, the grounding radiation element, the shorting radiation element, and the third radiation element are all disposed on the same surface of the dielectric substrate.

In some embodiments, the third radiation element has a first notch and a second notch. The second radiation element at least partially extends into the first notch.

In some embodiments, a first coupling gap is formed between the feeding radiation element and the third radiation element. A second coupling gap is formed between the second radiation element and the third radiation element. The width of each of the first coupling gap and the second coupling gap is from 1 mm to 2 mm.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the total length of the feeding radiation element, the first radiation element, and the grounding radiation element is substantially equal to 0.5 wavelength of the first frequency band.

In some embodiments, the total length of the feeding radiation element and the first radiation element is substantially equal to 0.5 wavelength of the second frequency band.

In some embodiments, the length of the shorting radiation element is from 1 mm to 3 mm.

In some embodiments, the shorting radiation element is coupled to a first connection point on the feeding radiation element. The distance between the first connection point and the feeding point is from 1 mm to 2 mm.

In some embodiments, the length of the third radiation element is substantially equal to 0.25 wavelength of the second frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
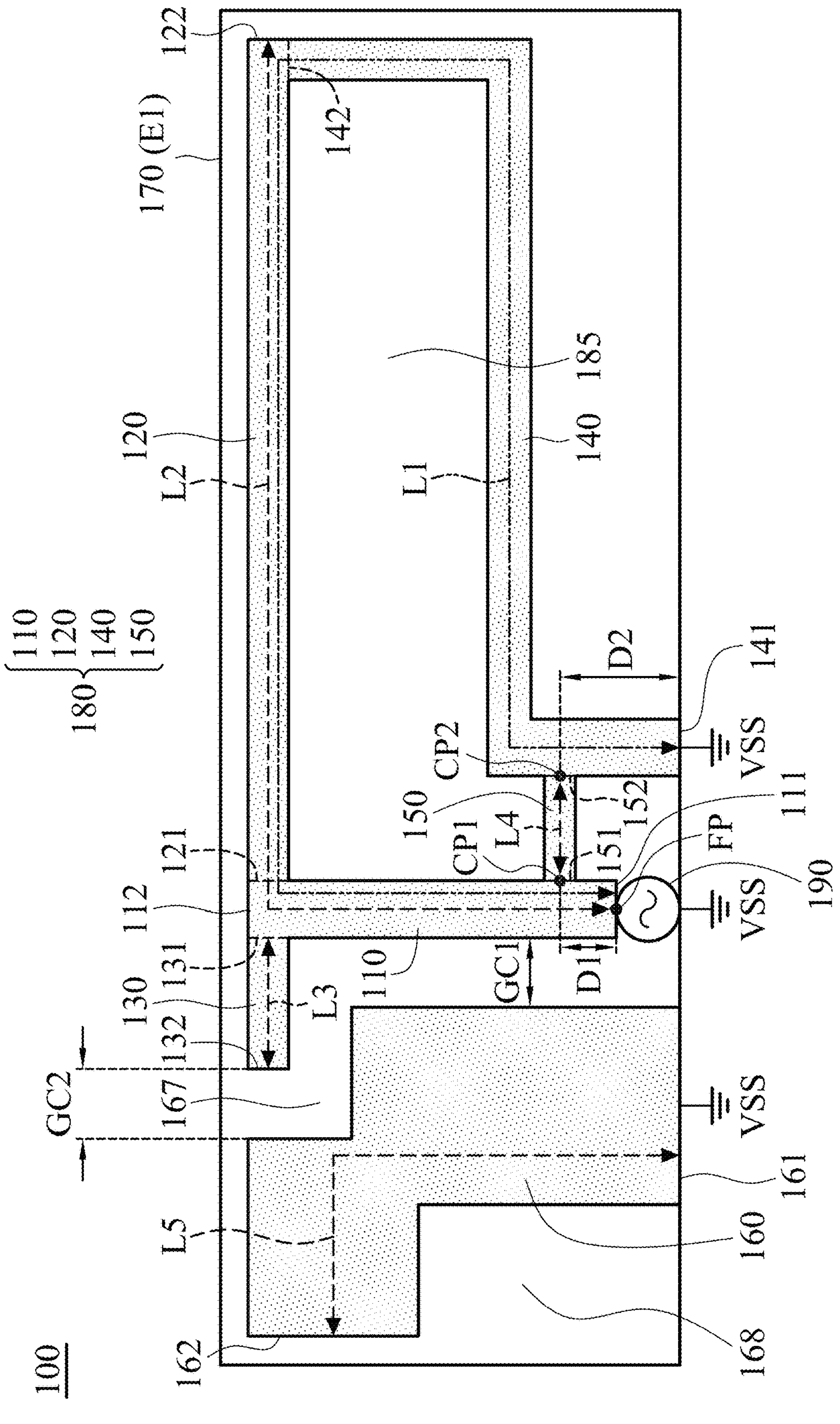
FIG. 1 is a top view of a mobile device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of a mobile device 100 according to an embodiment of the invention. For example, the mobile device 100 may be a smartphone, a tablet computer, or a notebook computer. As shown in FIG. 1, the mobile device 100 at least includes a feeding radiation element 110, a first radiation element 120, a second radiation element 130, a grounding radiation element 140, a shorting radiation element 150, and a third radiation element 160. The feeding radiation element 110, the first radiation element 120, the second radiation element 130, the grounding radiation element 140, the shorting radiation element 150, and the third radiation element 160 may all be made of metal materials, such as copper, silver, aluminum, iron, or their alloys. It should be understood that the mobile device 100 may further include other components, such as a processor, a touch control panel, a speaker, a power supply module, and/or a housing, although they are not displayed in FIG. 1.

The feeding radiation element 110 may substantially have a straight-line shape. Specifically, the feeding radiation element 110 has a first end 111 and a second end 112. A feeding point FP is positioned at the first end 111 of the feeding radiation element 110. The feeding point FP may be further coupled to a signal source 190. For example, the signal source 190 may be an RF (Radio Frequency) module.

The first radiation element 120 may substantially have a relatively long straight-line shape, which may be substantially perpendicular to the feeding radiation element 110. Specifically, the first radiation element 120 has a first end 121 and a second end 122. The first end 121 of the first radiation element 120 is coupled to the second end 112 of the feeding radiation element 110.

The second radiation element 130 may substantially have a relatively short straight-line shape (compared with the first radiation element 120), which may also be substantially perpendicular to the feeding radiation element 110. Specifically, the second radiation element 130 has a first end 131 and a second end 132. The first end 131 of the second radiation element 130 is coupled to the second end 112 of the feeding radiation element 110. The second end 132 of the second radiation element 130 is an open end. For example, the second end 122 of the first radiation element 120 and the second end 132 of the second radiation element 130 may substantially extend in opposite directions and away from each other. In some embodiments, the combination of the feeding radiation element 110, the first radiation element 120, and the second radiation element 130 substantially has a T-shape.

The grounding radiation element 140 may substantially have an N-shape or a Z-shape. Specifically, the grounding radiation element 140 has a first end 141 and a second end 142. The first end 141 of the grounding radiation element 140 is coupled to a ground voltage VSS. The second end 142 of the grounding radiation element 140 is coupled to the second 122 of the first radiation element 120. That is, the first radiation element 120 is further coupled through the grounding radiation element 140 to the ground voltage VSS. For example, the ground voltage VSS may be provided by a system ground plane (not shown) of the mobile device 100, and it may be implemented with a ground copper foil.

The shorting radiation element 150 is coupled between the feeding radiation element 110 and the grounding radiation element 140. Specifically, the shorting radiation element 150 has a first end 151 and a second end 152. The first end 151 of the shorting radiation element 150 is coupled to a first connection point CP1 on the feeding radiation element 110. The second end 152 of the shorting radiation element 150 is coupled to a second connection point CP2 on the grounding radiation element 140. For example, the first connection point CP1 may be adjacent to the feeding point FP, and the second connection point CP2 may be adjacent to the first end 141 of the grounding radiation element 140. In some embodiments, a closed loop structure 180 is formed by the feeding radiation element 110, the first radiation element 120, the grounding radiation element 140, and the shorting radiation element 150. A slot region 185 can be completely surrounded by the closed loop structure 180. For example, the slot region 185 may substantially have a variable-width L-shape, but it is not limited thereto. It should be noted that the term "adjacent" or "close" over the disclosure means that the distance (spacing) between two corresponding elements is smaller than a predetermined distance (e.g., 10 mm or shorter), but often does not mean that the two corresponding elements directly touch each other (i.e., the aforementioned distance/spacing between them is reduced to 0).

The third radiation element 160 may substantially have a variable-width inverted L-shape. Specifically, the third radiation element 160 has a first end 161 and a second end 162. The first end 161 of the third radiation element 160 is coupled to the ground voltage VSS. The second end 162 of the third radiation element 160 is an open end. For example, the second end 132 of the second radiation element 130 and the second end 162 of the third radiation element 160 may substantially extend in the same direction. In some embodiments, the third radiation element 160 further has a first notch 167 and a second notch 168. The second end 132 of the second radiation element 130 can at least partially extend into the first notch 167. For example, the first notch 167 may substantially have a square shape, and the second notch 168 may substantially have a rectangular shape, but they are not limited thereto. In some embodiments, the third radiation element 160 is adjacent to both of the feeding radiation element 110 and the second radiation element 130. A first coupling gap GC1 may be formed between the feeding radiation element 110 and the third radiation element 160. A second coupling gap GC2 may be formed between the second radiation element 130 and the third radiation element 160.

In some embodiments, the mobile device 100 further includes a dielectric substrate 170. For example, the dielectric substrate 170 may be an FR4 (Flame Retardant 4) substrate, a PCB (Printed Circuit Board), or a FPC (Flexible Printed Circuit). The feeding radiation element 110, the first radiation element 120, the second radiation element 130, the grounding radiation element 140, the shorting radiation element 150, and the third radiation element 160 are all disposed on the same surface E1 of the dielectric substrate 170.

In a preferred embodiment, an antenna structure of the mobile device 100 is formed by the feeding radiation element 110, the first radiation element 120, the second radiation element 130, the grounding radiation element 140, the shorting radiation element 150, and the third radiation element 160. For example, the aforementioned antenna structure may be a planar antenna structure, so as to minimize the device size and reduce the manufacturing cost. However, the invention is not limited thereto. In alternative embodiments, the aforementioned antenna structure is modified to a 3D (Three-Dimensional) antenna structure.

Figure 2:
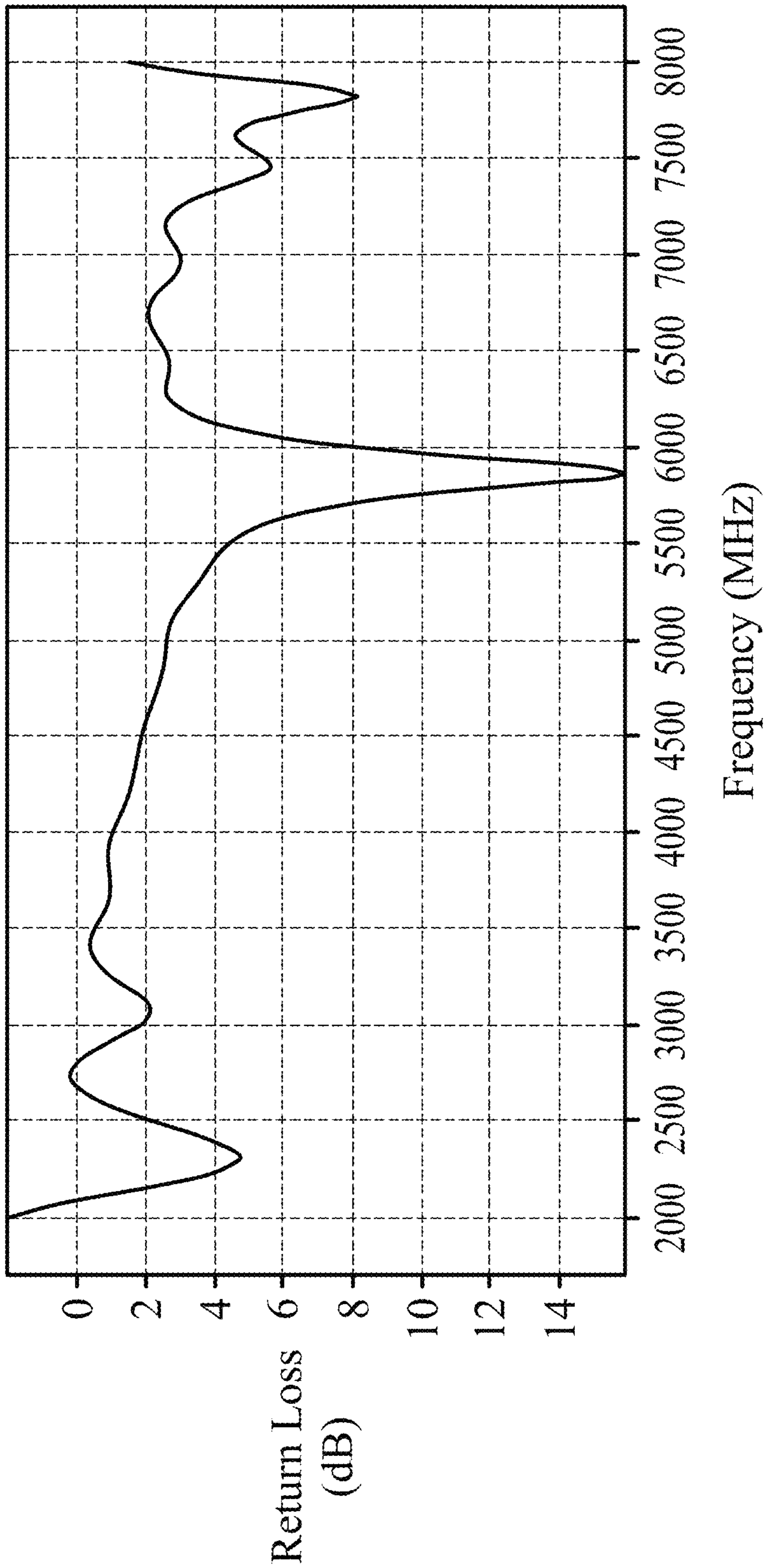
FIG. 2 is a diagram of return loss of an antenna structure of a conventional mobile device.

FIG. 2 is a diagram of return loss of an antenna structure of a conventional mobile device. The horizontal axis represents the operational frequency (MHz), and the vertical axis represents the return loss (dB). As shown in FIG. 2, if the conventional antenna structure is adjacent to any metal element (e.g., a housing of a metal base with a cutting retraction design), its radiation performance may be negatively affected so much, such that it cannot cover the desired wideband operations.

Figure 3:
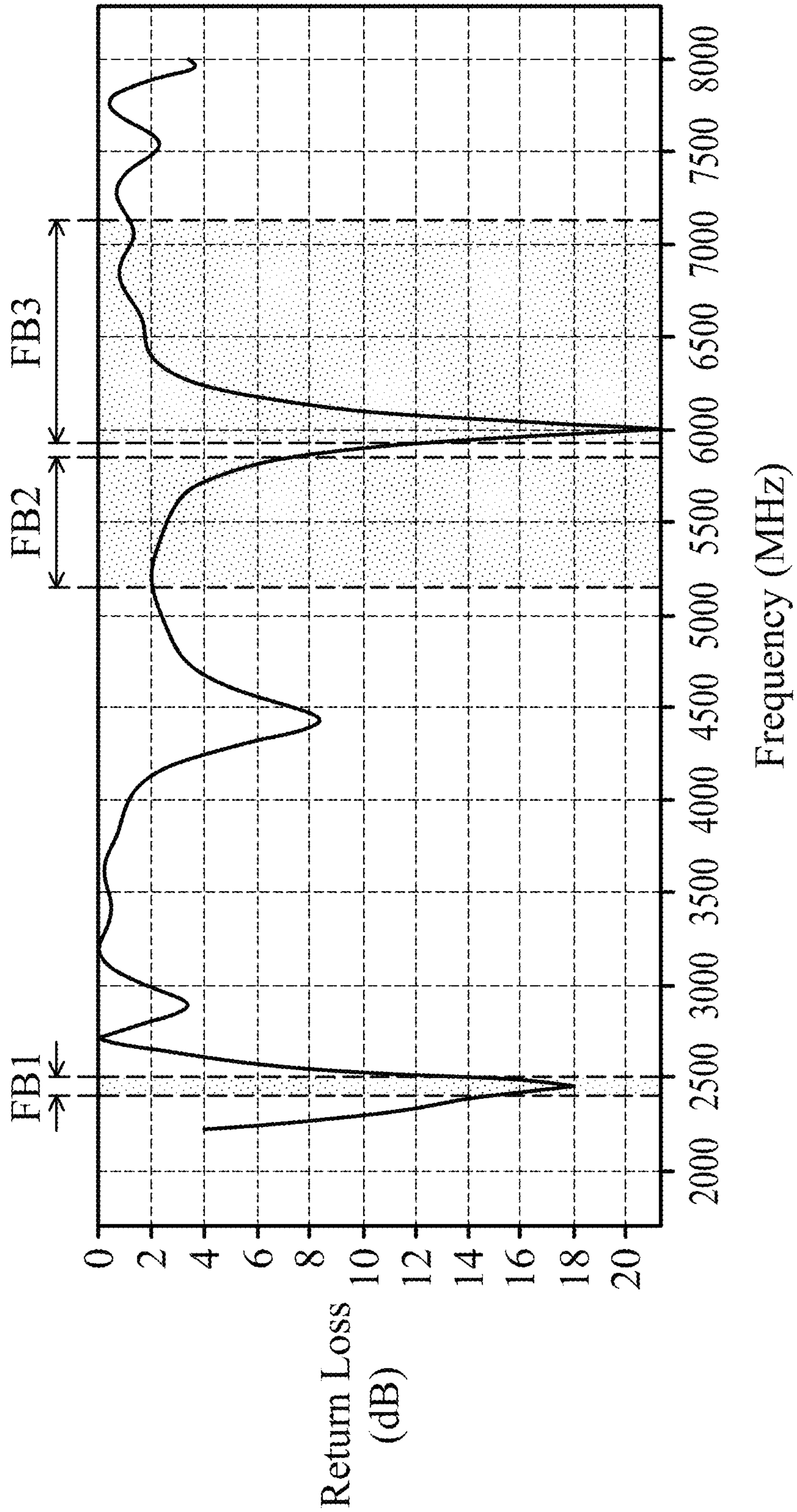
FIG. 3 is a diagram of return loss of an antenna structure of a mobile device according to an embodiment of the invention.

FIG. 3 is a diagram of return loss of the antenna structure of the mobile device 100 according to an embodiment of the invention. The horizontal axis represents the operational frequency (MHz), and the vertical axis represents the return loss (dB). According to the measurement of FIG. 3, the antenna structure of the mobile device 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the mobile device 100 can support at least the wideband operations of WLAN (Wireless Local Area Network), Wi-Fi 6E, and Wi-Fi 7.

The operational principles in some embodiments of the antenna structure of the mobile device 100 are described below. The feeding radiation element 110, the first radiation element 120, and the grounding radiation element 140 can be excited to generate a fundamental resonant mode, thereby forming the first frequency band FB1. The feeding radiation element 110, the first radiation element 120, and the third radiation element 160 can be excited to generate the second frequency band FB2. The second radiation element 130 can be used to fine-tune the impedance matching of the second frequency band FB2. The feeding radiation element 110, the first radiation element 120, and the grounding radiation element 140 can be further excited to generate a higher-order resonant mode, thereby forming the third frequency band FB3. According to practical measurements, the incorporation of the shorting radiation element 150 and the use of the closed loop structure 180 can help to suppress the interferences from nearby metal elements. In other words, the proposed antenna structure of the mobile device 100 can be applied in a variety of complicated environments, and it can also keep good communication quality.

Figure 4:
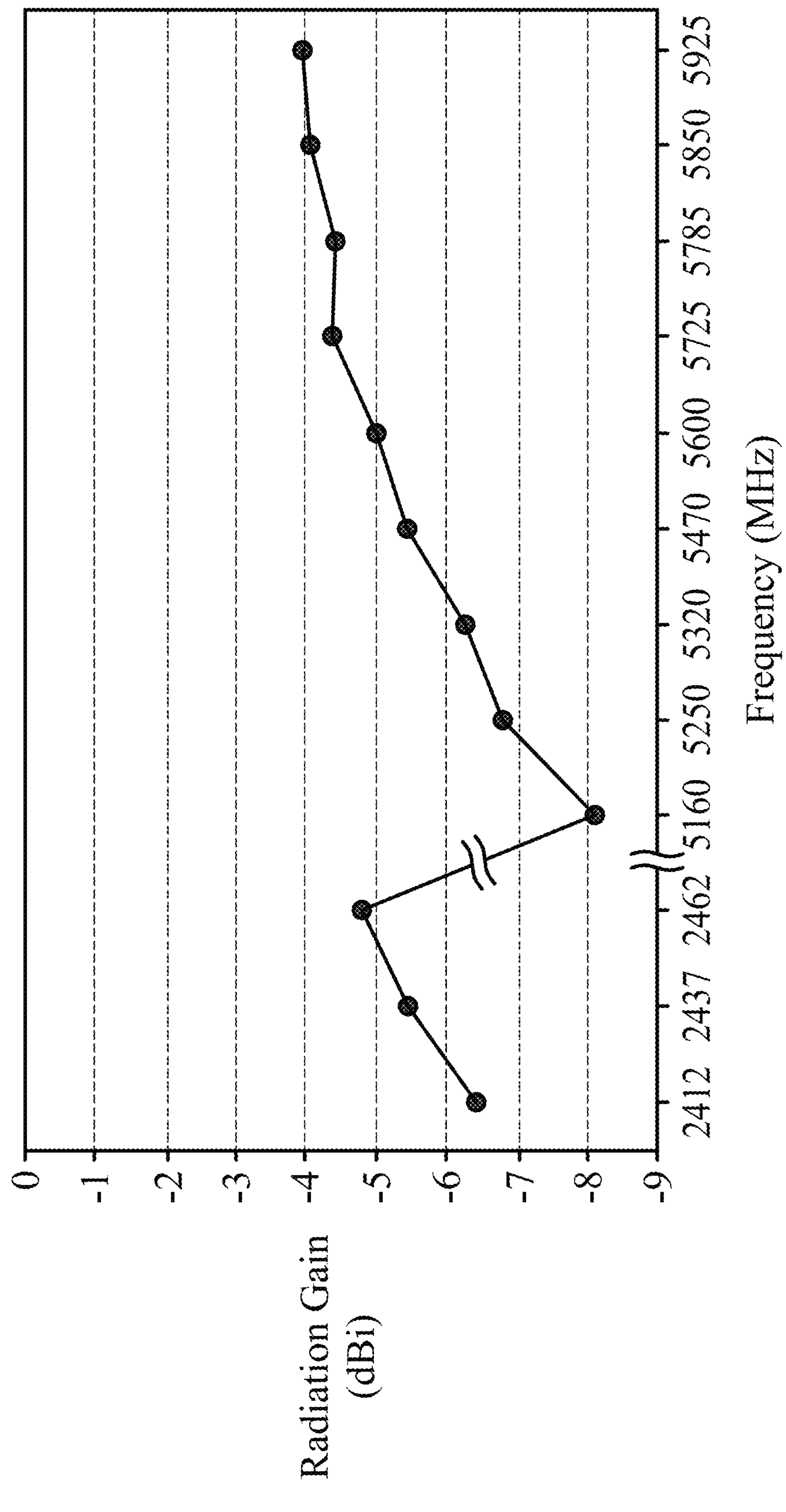
FIG. 4 is a diagram of radiation gain of an antenna structure of a mobile device according to an embodiment of the invention.

FIG. 4 is a diagram of radiation gain of the antenna structure of the mobile device 100 according to an embodiment of the invention. The horizontal axis represents the operational frequency (MHz), and the vertical axis represents the radiation gain (dBi). According to the measurement of FIG. 4, the radiation gain of the antenna structure of the mobile device 100 can reach −6 dBi or higher within the first frequency band FB1 and the second frequency band FB2 as mentioned above. It can meet the requirement of practical application of a general mobile communication device.

The element sizes of the mobile device 100 in some embodiments are described below. The total length L1 of the feeding radiation element 110, the first radiation element 120, and the grounding radiation element 140 may be substantially equal to 0.5 wavelength (λ/2) of the first frequency band FB1 of the antenna structure of the mobile device 100, or may be substantially equal to 1 wavelength (1λ) of the third frequency band FB3 of the antenna structure of the mobile device 100. The total length L2 of the feeding radiation element 110 and the first radiation element 120 may be substantially equal to 0.5 wavelength (λ/2) of the second frequency band FB2 of the antenna structure of the mobile device 100. The length L3 of the second radiation element 130 may be from 2 mm to 3 mm. The length L4 of the shorting radiation element 150 may be from 1 mm to 3 mm. The length L5 of the third radiation element 160 may be substantially equal to 0.25 wavelength (λ/4) of the second frequency band FB2 of the antenna structure of the mobile device 100. The distance D1 between the first connection point CP1 and the feeding point FP may be from 1 mm to 2 mm. The distance D2 between the second connection point CP2 and the first end 141 of the grounding radiation element 140 may be shorter than or equal to 5 mm. The width of the first coupling gap GC1 may be from 1 mm to 2 mm. The width of the second coupling gap GC2 may be from 1 mm to 2 mm. The above ranges of element sizes were calculated and obtained according to many experimental results, and they help to optimize the radiation gain, the impedance matching, and the operational bandwidth of the antenna structure of the mobile device 100.

Figure 5:
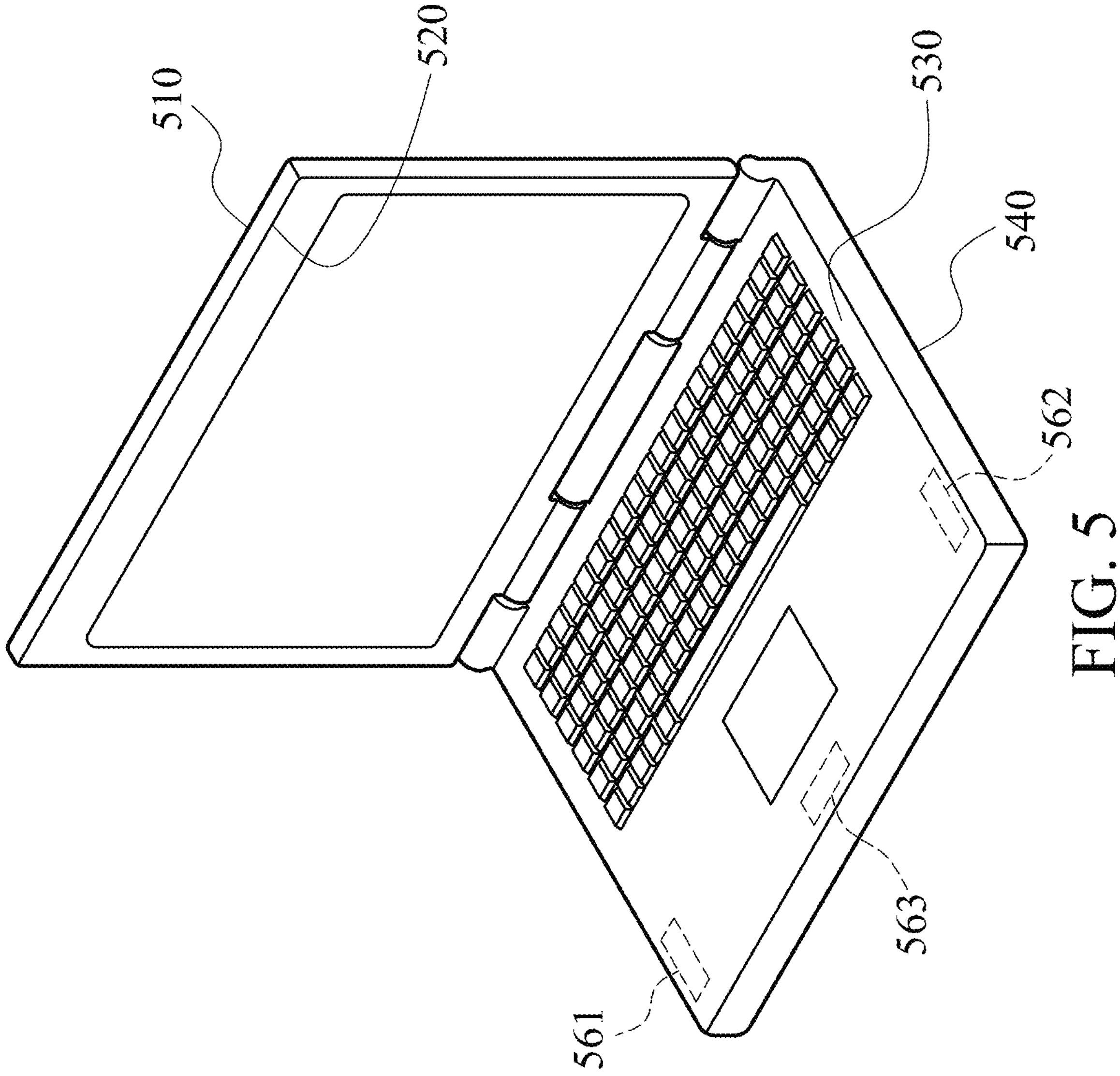
FIG. 5 is a perspective view of a notebook computer according to an embodiment of the invention.

FIG. 5 is a perspective view of a notebook computer 500 according to an embodiment of the invention. In the embodiment of FIG. 5, the aforementioned antenna structure is applied in the notebook computer 500. The notebook computer 500 includes an upper cover housing 510, a display frame 520, a keyboard frame 530, and a base housing 540. It should be understood that the upper cover housing 510, the display frame 520, the keyboard frame 530, and the base housing 540 are respectively equivalent to the so-called "A-component", "B-component", "C-component", and "D-component" in the field of notebook computers. For example, the keyboard frame 530 may be made of a non-conductive material, and the base housing 540 may be made of a metal material. In addition, the aforementioned antenna structure may be disposed between the keyboard frame 530 and the base housing 540, and may be adjacent to a first position 561, a second position 562 or a third position 563 of the notebook computer 500. According to practical measurements, such an arrangement can help to maintain the radiation performance of the aforementioned antenna structure and also to improve the overall communication quality of the notebook computer 500.

The invention proposes a novel mobile device with a novel antenna structure. In comparison to the conventional design, the invention has several advantages, including its small size, wide bandwidth, low manufacturing cost, and high radiation gain. Therefore, the invention is suitable for application in a variety of communication devices.

Note that the above element sizes, element shapes, and frequency ranges are not limitations of the invention. An antenna designer can fine-tune these settings or values according to different requirements. It should be understood that the mobile device of the invention is not limited to the configurations of FIGS. 1-5. The invention may merely include any one or more features of any one or more embodiments of FIGS. 1-5. In other words, not all of the features displayed in the figures should be implemented in the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device supporting wideband operations, comprising:

a feeding radiation element, having a feeding point;

a first radiation element, coupled to the feeding radiation element;

a second radiation element, coupled to the feeding radiation element, wherein the first radiation element and the second radiation element substantially extend in opposite directions;

a grounding radiation element, wherein the first radiation element is further coupled through the grounding radiation element to a ground voltage;

a shorting radiation element, coupled between the feeding radiation element and the grounding radiation element, wherein a closed loop structure is formed by the feeding radiation element, the first radiation element, the grounding radiation element, and the shorting radiation element; and a third radiation element, coupled to the ground voltage, wherein the third radiation element is adjacent to the feeding radiation element and the second radiation element;

wherein an antenna structure is formed by the feeding radiation element, the first radiation element, the second radiation element, the grounding radiation element, the shorting radiation element, and the third radiation element.

2. The mobile device as claimed in claim 1, further comprising:

a dielectric substrate, wherein the feeding radiation element, the first radiation element, the second radiation element, the grounding radiation element, the shorting radiation element, and the third radiation element are disposed on a same surface of the dielectric substrate.

3. The mobile device as claimed in claim 1, wherein the third radiation element has a first notch and a second notch, and the second radiation element at least partially extends into the first notch.

4. The mobile device as claimed in claim 1, wherein a first coupling gap is formed between the feeding radiation element and the third radiation element.

5. The mobile device as claimed in claim 4, wherein a second coupling gap is formed between the second radiation element and the third radiation element.

6. The mobile device as claimed in claim 5, wherein a width of each of the first coupling gap and the second coupling gap is from 1 mm to 2 mm.

7. The mobile device as claimed in claim 1, wherein the antenna structure covers a first frequency band, a second frequency band, and a third frequency band.

8. The mobile device as claimed in claim 7, wherein the first frequency band is from 2400 MHz to 2500 MHz.

9. The mobile device as claimed in claim 7, wherein the second frequency band is from 5150 MHz to 5850 MHz.

10. The mobile device as claimed in claim 7, wherein the third frequency band is from 5925 MHz to 7125 MHz.

11. The mobile device as claimed in claim 7, wherein a total length of the feeding radiation element, the first radiation element, and the grounding radiation element is substantially equal to 0.5 wavelength of the first frequency band.

12. The mobile device as claimed in claim 7, wherein a total length of the feeding radiation element and the first radiation element is substantially equal to 0.5 wavelength of the second frequency band.

13. The mobile device as claimed in claim 7, wherein a length of the third radiation element is substantially equal to 0.25 wavelength of the second frequency band.

14. The mobile device as claimed in claim 1, wherein a length of the shorting radiation element is from 1 mm to 3 mm.

15. The mobile device as claimed in claim 1, wherein the shorting radiation element is coupled to a first connection point on the feeding radiation element, and a distance between the first connection point and the feeding point is from 1 mm to 2 mm.

* * * * *